US010006152B2

(12) United States Patent
Lehmann et al.

(10) Patent No.: US 10,006,152 B2
(45) Date of Patent: Jun. 26, 2018

(54) METHOD FOR THE PRODUCTION OF LIGNIN-CONTAINING PRECURSOR FIBRES AND ALSO CARBON FIBRES

(75) Inventors: André Lehmann, Potsdam (DE); Horst Ebeling, Premnitz (DE); Hans-Peter Fink, Teltow (DE)

(73) Assignee: Fraunhofer-Gesellschaft zur förderung der angewandten Forschung e.V., München (DE)

(*) Notice: Subject to any disclaimer, the term of this patent is extended or adjusted under 35 U.S.C. 154(b) by 877 days.

(21) Appl. No.: 14/118,480

(22) PCT Filed: May 16, 2012

(86) PCT No.: PCT/EP2012/059114
§ 371 (c)(1),
(2), (4) Date: Mar. 13, 2014

(87) PCT Pub. No.: WO2012/156443
PCT Pub. Date: Nov. 22, 2012

(65) Prior Publication Data
US 2015/0037241 A1 Feb. 5, 2015

(30) Foreign Application Priority Data

May 18, 2011 (EP) .................................... 11004131

(51) Int. Cl.
D01F 9/17 (2006.01)
B29D 99/00 (2010.01)
B29C 47/00 (2006.01)
D01D 5/06 (2006.01)
D01F 9/00 (2006.01)
C08L 97/02 (2006.01)
B29K 33/20 (2006.01)
B29L 31/00 (2006.01)

(52) U.S. Cl.
CPC ............ *D01F 9/17* (2013.01); *B29C 47/0014* (2013.01); *B29D 99/0078* (2013.01); *C08L 97/02* (2013.01); *D01D 5/06* (2013.01); *D01F 9/00* (2013.01); *B29K 2033/20* (2013.01); *B29L 2031/731* (2013.01)

(58) Field of Classification Search
CPC ......... D01F 9/17; D01F 9/00; B29D 99/0078; B29C 47/0014; C08L 97/02; D01D 5/06; B29L 2031/731; B29K 2033/20
USPC ...... 264/176.1, 206, 176.16, 178 R, 181, 182
See application file for complete search history.

(56) References Cited

U.S. PATENT DOCUMENTS

| 2,558,735 | A | * | 7/1951 | Cresswell | D01F 6/18 260/DIG. 19 |
| 3,051,545 | A | * | 8/1962 | Steuber | D01D 5/06 264/182 |
| 3,461,082 | A | | 8/1969 | Otani et al. | |
| 3,562,378 | A | * | 2/1971 | Yoshimasa et al. | D01F 8/08 264/168 |
| 4,366,314 | A | * | 12/1982 | Beecken | C09B 23/105 540/543 |
| 5,013,502 | A | * | 5/1991 | Reinehr | D01F 6/18 264/103 |
| 6,103,211 | A | * | 8/2000 | Matsuhisa | D01F 6/18 423/447.1 |
| 6,641,915 | B1 | * | 11/2003 | Kasabo | D01F 9/22 264/182 |
| 7,678,358 | B2 | | 3/2010 | Eckert et al. | |
| 2003/0056484 | A1 | * | 3/2003 | Oda | D01C 1/02 57/28 |
| 2010/0210745 | A1 | * | 8/2010 | McDaniel | C09D 5/008 521/55 |
| 2012/0003471 | A1 | * | 1/2012 | Bissett | D01D 1/02 428/367 |
| 2012/0097194 | A1 | * | 4/2012 | McDaniel | A01N 63/02 134/26 |
| 2013/0193227 | A1 | * | 8/2013 | Hirai | B41J 2/055 239/102.2 |
| 2014/0099505 | A1 | * | 4/2014 | Thunga | D01F 9/17 428/373 |
| 2014/0194603 | A1 | * | 7/2014 | Lehmann | D01D 5/06 530/502 |
| 2014/0242867 | A1 | * | 8/2014 | Jansen | C07G 1/00 442/181 |

FOREIGN PATENT DOCUMENTS

| JP | 2013-532238 A | 8/2013 |
| WO | WO 2012/003070 A1 | 1/2012 |

OTHER PUBLICATIONS

Japan Patent Office, Notification of Reasons for Refusal in Japanese Patent Application No. 2014-510792 (dated Jun. 22, 2016).
European Patent Office, Office Action in European Patent Application No. 12721298.3, dated Jun. 16, 2015, 3 pp.
Bahl et al., "Manufacture of Carbon Fibers," Chapter 1, *Carbon Fibers*, 3$^{rd}$ edition Revised and Expanded, edited by Jean-Baptiste Donner et al., Marcel Dekker, Inc., New York, pp. 1-27 (1998).
Kadla et al., "Lignin-based carbon fibers for composite fiber applications," *Carbon* 40:15 pp. 2913-2920 (2002).
Kubo et al., "Preparation of carbon fibers from softwood lignin by atmospheric acetic acid pulping," *Carbon* 36:7-8 pp. 1119-1124 (1998).
Peng et al., "Lyocell fibers as the precursor of carbon fibers," *J. Appl. Polymer Sci.* 90(7), pp. 1941-1947 (2003).

(Continued)

*Primary Examiner* — Nahida Sultana
(74) *Attorney, Agent, or Firm* — Leydig, Voit & Mayer, Ltd.

(57) ABSTRACT

The invention relates to a method for the production of a precursor for the production of carbon- and activated carbon fibres according to the wet- or air-gap spinning method, in which a solution of lignin and a fiber-forming polymer in a suitable solvent is extruded through the holes of a spinning nozzle into a coagulation bath, the formed thread is stretched and subsequently treated, dried at an elevated temperature and then wound up. The lignin-containing thread is an economical starting material for the production of carbon- and activated carbon fibres.

13 Claims, No Drawings

(56) References Cited

OTHER PUBLICATIONS

Sudo et al., "A new carbon fiber from lignin," *J. Appl. Polymer Sci.*, 44:1 pp. 127-134 (1992).
Zhang et al., *Die Angewandte makromolekulare Chemie* 222 pp. 147-163 (1994).
European Patent Office, International Search Report in International Application No. PCT/EP2012/059114 (dated Jul. 26, 2012).
European Patent Office, International Preliminary Report on Patentability in International Application No. PCT/EP2012/059114 (dated Nov. 28, 2013).
Japanese Patent Office, Official Rejection in Japanese Patent Application No. 2014-510792 (dated May 10, 2017).

* cited by examiner

METHOD FOR THE PRODUCTION OF LIGNIN-CONTAINING PRECURSOR FIBRES AND ALSO CARBON FIBRES

CROSS-REFERENCE TO RELATED APPLICATIONS

This patent application is the U.S. national phase of International Application No. PCT/EP2012/059114, filed on May 16, 2012, which claims the benefit of European Patent Application No. 11004131.6, filed May 18, 2011, the disclosures of which are incorporated by reference.

The invention relates to a method for the production of a precursor for the production of carbon- and activated carbon fibres according to the wet- or air-gap spinning method, in which a solution of lignin and a fibre-forming polymer in a suitable solvent is extruded through the holes of a spinning nozzle into a coagulation bath, the formed thread is stretched and subsequently treated, dried at an elevated temperature and then wound up. The lignin-containing thread is an economical starting material for the production of carbon- and activated carbon fibres.

Carbon fibres are high-performance reinforcing fibres which are used essentially for composite materials in aircraft construction, high-performance vehicle construction (Formula I, high-performance sailing ships etc.), for sports equipment and increasingly for wind energy plants. Currently, extensive efforts are being made worldwide to introduce carbon fibres of average quality (at a reduced price level) into mass applications in automobile construction, the development of weight-reduced electric vehicles which is sought publicly in the meantime representing an essential driving force.

Carbon fibres are produced by heat treatment above 1,000° C. of organic precursor fibres. The first carbon fibres were developed on the basis of cellulose precursors and used as filaments in lamps. Nowadays, polyacrylonitrile or copolymers of polyacrylonitrile are the dominating polymers for the production of precursors for carbon fibres. The palette of carbon fibres based on PAN is supplemented by high-modulus carbon fibre made from pitch. For PAN-based carbon fibres, the estimated annual capacity in 2010 was at approx. 77,000 t and, for pitch-based carbon fibres, at 1,830 t (technical textiles March 2010). An overview of the production, the structure, the mechanical properties and also the application of PAN- and pitch-based carbon fibres is provided in: J. P. Donnet et al., Carbon fibers, third edition, Marcel Dekker, Inc. New York, Basle, Hong Kong.

Polyacrylonitrile and pitch are products of the petrochemical industry and hence are subject to the typical cost increase for this branch of industry. In the last few years, a development trend for developing precursors which are not linked to the oil price with respect to the raw materials resulted therefrom. This trend was forced by the demand for carbon fibres in the average quality segment and hence also in the average price segment for mass applications, as are seen in automobile construction.

Also biopolymers thereby came into focus. Reference was made already to cellulose (rayon) as raw material for the first carbon fibre. Also Lyocell fibres were examined as precursor (S. Peng et al., J. Appl. Polymer Sci. 90 (2003) 1941-1947). It was shown that the Lyocell-based carbon fibres have somewhat greater strength than the rayon-based fibres produced under comparable conditions. 1 GPa for the strength and approx. 100 GPa for the modulus of elasticity are however at a very low level for carbon fibres. In addition to the cellulose man-made fibre, also cellulose natural fibres were tested as precursor for carbon fibre. M. Zhang et al. (Die Angewandte makromolekulare Chemie (Applied macromolecular chemistry) 222 (1994) 147-163) used sisal fibre as precursor for carbon fibre production. With a strength of 0.82 GPa and a modulus of elasticity of 25 GPa, the carbon fibres produced therefrom are at a very low level.

Another biopolymer which increasingly is gaining importance in precursor development is lignin. Lignin is a polyaromatic polyol which is a component of wood and occurs in large quantities as a by-product of cellulose production. The carbon proportion is at approx. 60-65%. The chemical structure of lignin is determined by the type of wood used in the cellulose process and also the method of cellulose digestion which is applied. The main quantities of the resulting lignin are supplied for energy use. With lignin, an extremely economical raw material is available in very large quantities and is in practice not fibre-forming in the unmodified form. One objective was the development of melt-spun lignin-containing precursors. J. F. Kadla et al. (Carbon 40 (2002) 2913-2920) describe the production of lignin fibre by melt-spinning of a commercially available kraft lignin and also melt-spinning of a mixture of lignin with low proportions up to 5% of polyethylene oxide (PEO). Processing of pure lignin requires a thermal pre-treatment which increases the raw material costs and, in mixtures, only small proportions of PEO are possible since, with larger quantities of PEO, adhesion occurs in the stabilising process. The carbon fibres made from the melt-spun lignin-containing precursors had strengths of approx. 0.4 GPa and moduli in the range 40-50 GPa and hence still do not fulfil the mechanical characteristic values sought by automobile construction, strength approx. 1.7 GPa and modulus approx. 170 GPa. Kubo et al. (Carbon 36 (1998) 1119-1124) describe a process for the melt-spinning of lignin, in which, in a pretreatment step, the non-melting high-molecular components are removed from the lignin. In a further publication, K. Sudo et at (J. Appl. Polymer Sci., 44 (1992) 127-134) describe the pretreatment of lignin with organic solvents with subsequent melt-spinning of the chloroform-soluble fraction. The carbon fibres produced therefrom had merely a low strength level.

U.S. Pat. No. 7,678,358 claims acetylation of lignin as precursor of lignin melt-spinning without however giving any information relating to the properties of the carbon fibres produced in this way. The state of the art shows that it is possible in principle to produce melt-spun lignin-containing precursors for carbon fibres. However it is also shown that the property level of carbon fibre based on PAN or pitch is not achieved. The question remains open as to whether the lignin modification required to make this suitable for melt-spinning does not again offset the cost advantage of the economical raw material, lignin.

The object underlying the invention is to develop an economical method for the production of a lignin-containing precursor based on a solution-spinning method for the production of carbon- and activated carbon fibres.

Furthermore, it is the object of the present invention to indicate a corresponding lignin-containing precursor fibre. In addition, the present invention relates to further processing of the precursor fibres to form carbon fibres and also correspondingly produced activated carbon fibres.

This object is achieved by the method for production of a lignin-containing precursor fibre described herein, by the features of the correspondingly produced precursor fibre the method for the production of a carbon fibre described herein, and by the features of the correspondingly produced carbon fibre.

In the case of the method according to the invention for the production of a lignin-containing precursor fibre for the production of carbon fibres and/or activated carbon fibres, a solution, comprising at least one sort of lignin and also at least one fibre-forming polymer selected from the group consisting of polyacrylonitrile and/or polyacrylonitrile-copolymers in at least one solvent, is introduced into a coagulation bath by extrusion of the solution through a spinning nozzle, by the wet spinning or air gap spinning method the lignin-containing precursor fibre precipitating.

In the method according to the invention, the preferably low processing temperature of the solution, once produced, during extrusion thereof into the coagulation bath is particularly advantageous, the maximum upper limit of this temperature being prescribed by the nature of the coagulation bath (boiling point). Generally, the temperature of the coagulation bath is hence below 100° C. As a result, extremely gentle processing of the lignin fibres is provided, which surprisingly leads to the carbon fibres produced from these precursor fibres having significantly increased tensile strength.

There is understood, according to the invention, by the term "solution" that all the components of the solution, i.e. both the lignin and the fibre-forming polymer, are completely solvated by the solvent. However, this term likewise also includes the possibility that the lignin fibres and/or the fibre-forming polymer are present partly undissolved herein.

A preferred embodiment of the method provides that the solution used in step a) is produced by agitation or kneading of the at least one sort of lignin and also of the at least one fibre-forming polymer in the at least one solvent, preferably at temperatures of 60° C. or more, particularly preferred of 80° C. or more.

Furthermore, it is advantageous if the solution is filtered before introduction into the coagulation bath, any possibly contained insoluble components being able to be separated.

In a particularly preferred embodiment, the spinning hole diameter of the spinning nozzle is from 50 to 600 μm, preferably 100 to 500 μm.

The methods for introducing the solution into the precipitation bath or coagulation bath are thereby effected in the wet-spinning method or in the air-gap spinning method, the air gap in the case of an air-gap spinning method being preferably at least 10 mm, further preferred at least 20 mm and at most 500 mm.

Further advantageous aspects of the method according to the invention provide that the lignin-containing fibre according to step b)

a) is stretched, preferably is stretched to at least 1.1 times, further preferred to 1.1 to 16 times, particularly preferred to at least 1.5 times, particularly preferred to at least 2 times its length, in particular at a temperature of at least 60° C., preferably at least 80° C., further preferred at least 90° C., particularly preferred of at least 100° C., the stretching being implemented preferably in the precipitation bath, in air or in water vapour, b) is washed, preferably washed with demineralised water, c) is treated subsequently with textile aids for improving the thread strength and for avoiding electrostatic charges, d) is dried, in particular by winding up or winding round of the fibre onto or around heated rollers and/or by through-flow drying at a temperature of at least 80° C., preferably at least 100° C. and/or e) is wound up.

Furthermore, it is advantageously possible that the fibre is treated with a spinning oil before drying, after drying or before and after drying.

Preferred concentrations of the at least one sort of lignin are thereby from 1 to 99% by weight, preferably from 2 to 30% by weight, particularly preferred from 3 to 20% by weight, relative to the entire solution.

Advantageous concentrations of the at least fibre-forming polymer are thereby, relative to the entire solution, from 1 to 99% by weight, preferably from 5 to 40% by weight, particularly preferred from 7 to 30% by weight, likewise relative to the entire solution.

In a particularly preferred embodiment, the coagulation bath comprises water or a mixture of water and an organic liquid, such as aprotic polar solvents, in particular dimethylsulfoxide (DMSO), such as aliphatic amides which are liquid at room temperature, in particular dimethylformamide (DMF) or dimethylacetamide (DMAc); tertiary amine oxides, N-methylmorpholine-N-oxide; ionic liquids, preferably ionic liquids selected from the group consisting of imidazolium compounds, pyridinium compounds or tetraalkylammonium compounds, particularly preferred 1-butyl-3-methylimidazolium chloride, 1-butyl-3-methylimidazolium acetate, 1-ethyl-3-methylimidazolium acetate and/or mixtures hereof.

An advantageous pH value of the coagulation bath is thereby between 1 and 7, preferably between 2 and 5.

The solvent for the spinning solution, i.e. the solution which comprises the lignin and also at least one fibre-forming polymer, is thereby selected preferably from the group of aprotic polar solvents in particular dimethylsulfoxide (DMSO), dimethylformamide (DMF), or dimethylacetamide (DMAc); tertiary amine oxides, in particular aqueous N-methylmorpholine-N-oxide (NMMNO, in particular NMMNO monohydrate); ionic liquids, preferably ionic liquids selected from the group consisting of imidazolium compounds, pyridinium compounds or tetraalkylammonium compounds, particularly preferred 1-butyl-3-methylimidazolium chloride, 1-butyl-3-methylimidazolium acetate, 1-ethyl-3-methylimidazolium acetate; and/or mixtures hereof.

The fibre-forming polymers are selected from the group consisting of polyacrylnitrile, polyacrylonitrile-copolymers, in particular polyacrylonitrile copolymers with a polyacrylonitrile content of 85% by weight or more, preferably 90% by weight or more and/or mixtures or blends hereof.

The fibre-forming polymers are selected from the group consisting of polyacrylonitrile, polyacrylonitrile-copolymers, in particular polyacrylonitrile copolymers with a polyacrylonitrile content of 85% by weight or more, preferably 90% by weight or more and/or mixtures or blends hereof.

According to the invention, a precursor fibre for the production of carbon fibres is likewise indicated. The precursor fibre according to the invention is distinguished by a) a content of at least one sort of lignin 1% to 99% by weight, preferably 20 to 60% by weight, b) a content of at least one sort of fibre-forming polymer of 1% to 99% by weight, preferably 40 to 80% by weight, and c) possibly a strength of at least 10 cN/tex, preferably at least 20 cN/tex, and/or d) possibly a modulus of elasticity of at least 1,000 cN/tex, preferably at least 1,300 cN/tex.

The precursor fibre according to the invention can be produced particularly advantageously according to a previously described method.

Definitions of lignin and the fibre forming polymers can be found in the description.

Furthermore, a method is indicated according to the present invention for the production of a carbon fibre, in which a precursor fibre is stabilized at temperatures between 100 and 600° C. and is carbonised above 800° C. under inert conditions.

In a preferred embodiment, the carbon fibre is subjected to water vapour, after the carbonisation, at temperatures >200° C., preferably >300° C.

In addition, the present invention provides a carbon fibre which can be produced according to the previously described method for the production of the carbon fibre.

The present invention is explained in more detail with reference to the subsequent embodiments and examples without restricting the invention to the represented parameters.

The lignin is preferably mixed with the thread- or fibre-forming polymer and then dissolved in a suitable solvent by agitation or by a kneading process at an elevated temperature. The resulting solution is possibly filtered and then advantageously shaped to form filaments by wet- or air-gap spinning, which can be stretched under different conditions, washed, treated, dried and then wound up as a filament.

The different lignins, such as alkali lignin, lignosulphonate, thiolignin, organosolvlignin or types of lignin from alternative wood digestion processes, which are known to the person skilled in the art, as occur during cellulose production or also mixtures of these can be used. The lignins are washed intensively with water or possibly also with diluted acids up to an ash content of less than 1%.

As fibre-forming polymers polyacrylonitrile and polyacrylonitrile copolymers with an acrylonitrile content of greater than 85%, preferably greater than 90%, are used.

As solvent, for example aliphatic amides, such as DMF or DMAc, DMSO, tertiary amine oxides, preferably N-methylmorpholine-N-oxide or an ionic liquid, selected from the group consisting of imidazolium compounds, pyridinium compounds, tetraalkylammonium compounds and mixtures hereof, are used.

The spinning solution is preferably produced with agitation or by kneading at a temperature above 60° C., preferably above 80° C. The polymer concentration is adjusted for example to greater than 8%, preferably greater than 10%. The resulting viscous solution can be filtered using normal filtration devices and can be supplied as a homogeneous particle-free solution for intermediate storage before the spinning process.

The shaping of the spinning solution to form fibres or filaments is effected, according to the wet spinning or air-gap spinning method. In the case of the wet-spinning method, the spinning solution is pressed through the holes of a spinning nozzle, spinning nozzles with hole diameters of 50 to 500 μm being used. The extruded thread is solidified in the coagulation bath which consists of water or of a mixture of the polymer solvent and a nonsolvent. The nonsolvent can be preferably water or an aliphatic alcohol with a chain length up to C 8. When applying air-gap spinning, the viscous lignin-containing spinning solution is pressed through the holes of a spinning nozzle and the extruded threads are stretched in the air gap. The preferred nozzle hole diameter is preferably greater than 100 μm and should not exceed 600 μm. The air-gap length is at least 10 mm. The air-stretched thread is then coagulated comparably to wet-spinning.

The thread is stretched in water and/or a mixture of water and the solvent at a temperature greater than 80° C., preferably greater than 90° C. and in hot air and/or water vapour greater than 90° C., preferably greater than 100° C. up to a multiple of its length but by at least 1.1 times. The stretching can be effected before or even after the washing process.

The stretched and washed thread is treated, before the drying or after the drying or before and after the drying, with a spinning oil with an antistatic effect. Drying is effected on heated rollers or also by through-flow drying at temperatures greater than 80° C., preferably greater than 100° C.

The thus produced fibre comprises at least 10% lignin, preferably >20% lignin and one or more fibre-forming polymers, such as polyacrylonitrile and/or polyacrylonitrile copolymers. The fibres produced according to the invention have a tensile strength of at least 10 cN/tex and a modulus greater than 500 cN/tex and can be converted, according to known methods for stabilising and carbonisation, into carbon fibres and also, by a subsequent water vapour treatment, into activated carbon fibres with a high specific surface.

EXAMPLE 1

130 g of an air-dried polyacrylonitrile copolymer are mixed with 75 g air-dried organosolvlignin in 500 g DMAc and dissolved in a horizontal kneader at a temperature of 90° C. within 3 h. The resulting black, homogeneous solution is free of fibre residues and has a zero shear viscosity, measured at 80° C., of 376 Pas. The solution was pressed through an 80-hole spinning nozzle (hole diameter 100 μm) with the help of an extruder, stretched with a drawing ratio of 10 in the air gap and the filaments were precipitated in the aqueous coagulation bath. Washing of the filaments was effected with distilled water, drying was effected at heated rollers. The filaments had a strength of 28 cN/tex, an elongation of 5.3% and also a modulus of elasticity of 1,135 cN/tex. The lignin content was 47.3%.

EXAMPLE 2

75 g chemical cellulose, 75 g kraft lignin and 10 g polyacrylonitrile copolymer are mixed with 840 g 1-butyl-3-methylimidazolium chloride, subsequently dissolved by kneading within 4 hours at 110° C. and shaped by a wet-spinning process using a coagulation bath with 15% 1-butyl-3-methylimidazolium chloride and 85% water to form fibres, the fibres are stretched 1.8 times, treated with spinning oil and dried at 105° C. by means of heated rollers. The filaments had a strength of 32 cN/tex, an elongation of 6.4% and also a modulus of elasticity of 1,564 cN/tex. The lignin content was 45.8%.

The invention claimed is:

1. A method for the production of a lignin-containing precursor fibre, for the production of carbon fibres and/or activated carbon fibres, the method comprising:
    a) a solution, comprising at least one lignin and also at least one fibre-forming polymer selected from the group consisting of polyacrylonitrile and polyacrylonitrile-copolymers in at least one solvent,
    b) is transferred into a coagulation bath by extrusion of the solution through a spinning nozzle by wet spinning or air-gap spinning method, the lignin-containing precursor fibre precipitating, the coagulation bath comprises: (i) mixture of water, at least one tertiary amine oxide, and at least one ionic liquid, or (ii) mixture of water and at least one tertiary amine oxide.

2. The method according to claim 1, wherein the solution utilized in step a) is produced by agitation or kneading of the at least one lignin and also of the at least one fibre-forming polymer in the at least one solvent.

3. The method according to claim 1, wherein the solution is filtered before introduction into the coagulation bath.

4. The method according to claim 1, wherein the spinning hole diameter of the spinning nozzle is from 50 to 600 μm.

5. The method according to claim 1, wherein the lignin-containing fibre according to b)
- a) is stretched,
- b) is washed,
- c) is treated subsequently with textile aids for improving the thread strength and for avoiding electrostatic charges,
- d) is dried, and/or
- e) is wound up.

6. The method according to claim 5, wherein the fibre is treated with a spinning oil before drying, after drying or before and after drying.

7. The method according to claim 1, wherein, respectively relative to the entire solution, the concentration
- a) of the at least one lignin is from 1 to 99% by weight, and/or
- b) of the at least one fibre-forming polymer is from 1 to 99% by weight.

8. The method according to claim 1, wherein the pH value of the coagulation bath is between 2 and 5.

9. The method according to claim 1, wherein the at least one solvent is selected from the group consisting of aliphatic amides which are liquid at room temperature; tertiary amine oxides, ionic liquids, and mixtures thereof.

10. The method according to claim 1, wherein the polyacrylonitrile copolymers are selected from the group consisting of polyacrylonitrile copolymers with a polyacrylonitrile content of 85% by weight or more, mixtures and blends thereof.

11. The method according to claim 1, wherein the at least one lignin results from wood and annual plant pulping methods and is selected from the group consisting of alkali lignin, kraft lignin, lignosulphonate, thiolignin, organosolv-lignin, ASAM lignin, lignins from digestion processes by means of ionic liquids or enzymes, combinations and mixtures thereof.

12. The method according to claim 9, wherein the at least one solvent is selected from dimethylsulfoxide (DMSO), dimethylformamide (DMF), dimethylacetamide (DMAc), N-methylmorpholine-N-oxide; 1-butyl-3-methylimidazolium chloride, 1-butyl-3-methylimidazolium acetate, 1-ethyl-3-methylimidazolium acetate; pyridinium compounds, tetraalkylammonium compounds, and mixtures thereof.

13. The method of claim 5, wherein the lignin-containing fibre is stretched at least 1.1 to 16 times.

* * * * *